United States Patent [19]
Han et al.

[11] Patent Number: 5,533,158
[45] Date of Patent: Jul. 2, 1996

[54] ELECTROSTATIC BONDING OF OPTICAL FIBERS TO SUBSTRATES

[75] Inventors: Hongtao Han, Mechanicsburg; Songsheng Tan, Pittsburgh, both of Pa.

[73] Assignee: The Whitaker Corporation, Wilmington, Del.

[21] Appl. No.: 269,302

[22] Filed: Sep. 12, 1994

[51] Int. Cl.$^6$ .................................................. G02B 6/36
[52] U.S. Cl. .............................. 385/88; 385/96; 385/126; 385/128; 385/137
[58] Field of Search ............................ 385/14, 88, 96, 385/123, 126, 128, 136, 137

[56] References Cited

U.S. PATENT DOCUMENTS

| | | | |
|---|---|---|---|
| 4,294,602 | 10/1981 | Horne | 65/40 |
| 4,466,696 | 8/1984 | Carney | 350/96.20 |
| 4,475,790 | 10/1984 | Little | 385/137 |
| 4,867,524 | 9/1989 | Courtney et al. | 385/14 |
| 5,163,108 | 11/1992 | Armiento et al. | 385/89 |

OTHER PUBLICATIONS

"Low Temterature Electrostatic Silicon-to-Silicon Seals Using Sputtered Borosilicate Glass", A. D. Brooks, et al., *Journal of Electrochemical Society*, vol. 119, No. 4, p. 545 – Apr. 1972.

"Bonding Techniques for Microsensors", W. H. Ko, et al., *Elsevier Science Publishers B.V.*, p. 41–61, – Jan. 1985.

"Utilization of Electroplating to Lock Fibers for Use in Optical Device Packaging", L. A. Reith, et al., *Journal of Lightwave Technology*, vol. 10, No. 7 – Jul. 1992.

"Low Energy Metal–Glass Bonding", P. B. NeNee, *Communications*, pp. 5396–5397 – Jan. 1969.

"Field Assisted Glass–Metal Sealing", Wallis, et al., *Journal of Applied Physics*, vol. 40, No. 10, pp. 3946–3949 – Sep. 1969.

*Primary Examiner*—Rodney B. Bovernick
*Assistant Examiner*—Robert E. Wise

[57] ABSTRACT

An optical interconnect comprises a metallized optical fiber electrostatically bonded to a thin film of an alkali-containing glass which is itself bonded to a planar surface of a semiconductive or conductive substrate. Another optical interconnect comprises an optical fiber having a thin film of an alkali-containing glass deposited thereon, wherein the fiber is electrostatically bonded to a planar surface of a semiconductive or conductive substrate. A process of bonding an optical fiber to a semiconductive or conductive substrate includes contacting the fiber with the substrate, applying a DC potential to the fiber-substrate combination, slowly heating the combination to a maximum temperature between 180°–500° C., maintaining the combination at the maximum temperature for a few minutes, cooling the combination to room temperature, and removing the DC potential.

30 Claims, 3 Drawing Sheets

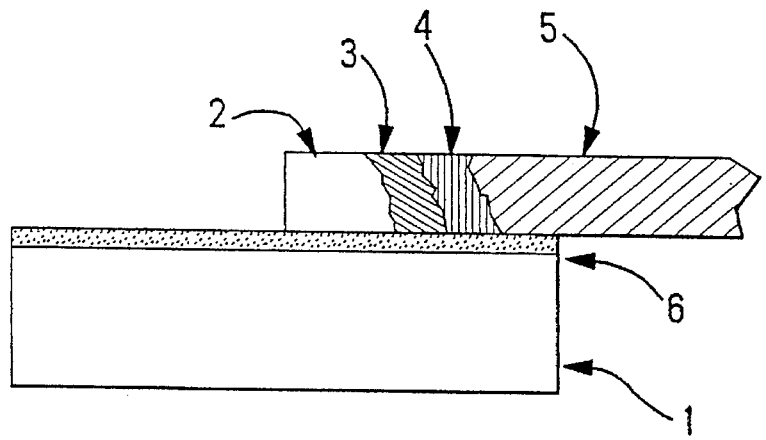
_Fig. 4_
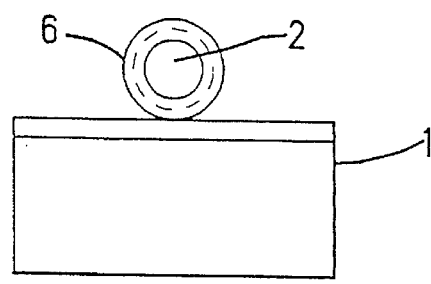
_Fig. 5_
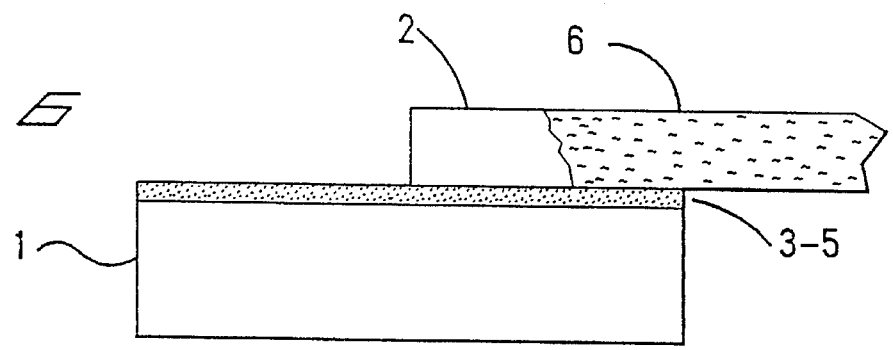
_Fig. 6_
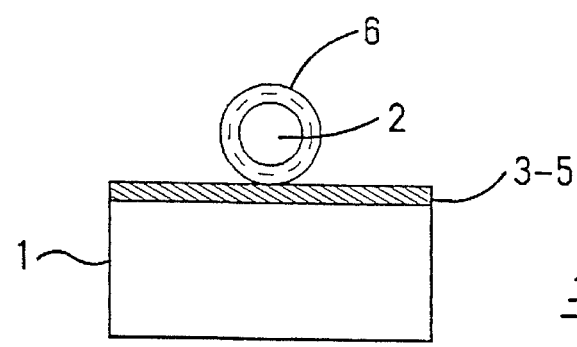
_Fig. 7_

ELECTROSTATIC BONDING OF OPTICAL FIBERS TO SUBSTRATES

FIELD OF THE INVENTION

This invention is directed to a process for bonding an optical fiber to a substrate, especially a semiconductive substrate. With increasing use of fiber optics in many fields of commerce, such as telecommunications, data transmission, etc., the need for a low cost and easily manufacturable optical interconnect has greatly expanded. State of the art optical interconnects require precise alignment of optical fibers with various optical devices mounted on semiconductor waferboards. However, such precise alignments are difficult to achieve, requiring intense efforts of a technician to actively align said optical fibers with said optical devices.

The present inventors have discovered a novel process for bonding optical fibers to a semiconductive or conductive substrate, and particularly a process for passively aligning optical fibers with optical devices mounted on such a semiconductor substrate.

DESCRIPTION OF RELATED ART

The use of alignment V-grooves for alignment of optical fibers with board-mounted optical devices, which are photolithographically defined and subsequently etched into the surface of a semiconductor substrate has been known in the art. For example, U.S. Pat. No. 5,163,108 discloses a method of passively aligning optical receiving elements, such as fibers, to the active elements of a light generating chip. Alignment is accomplished by use of a micro-machined substrate onto which the laser and fiber arrays are attached. Microfabrication techniques, such as wet chemical etching, are used to fabricate V-grooves in a silicon substrate for receiving the fibers of the array during the alignment procedure.

U.S. Pat. No. 4,466,696 discloses a self-aligned coupling of the core of an optical fiber to the narrow stripe emitting spot in the active layer of a narrow stripe semiconductor laser, wherein a V-groove is etched into the same substrate onto which the epitaxial layers for the narrow stripe laser have been grown. Critical alignment is done during the photolithographic process, wherein a pattern for the maximum width of the V-groove is formed on the surface of the semiconductor substrate. During the etching process, the V-grooves are formed by anisotropic etching of the semiconductor substrate in the (100) crystal plane parallel to the surface, in preference to the (111) crystal planes forming the side-wall of V-grooves.

However, the manner of fixing the optical fibers to the alignment V-grooves of the prior art has generally been through the use of adhesives, solders, laser welding, or electroplating. Epoxy adhesives have been used for many years for fiber attachment, largely due to their good availability, ease of use, and the initial lack of other viable alternatives. While the use of epoxy adhesives performs adequately for multi-mode fiber attachment, the large amount of adhesive necessary to secure said fibers ultimately interferes with the tight tolerance requirements for single-mode fibers, due in large part to expansion or shrinkage during the curing of the epoxies.

The use of solders was developed for single-mode fiber fixing. When using a solder for fiber fixing, the fiber must first be metallized with a suitable solderable material, such as Cr-Cu-Au systems. Various types of solder have been used for fixing fibers, such as the higher temperature, hard, gold-based solders, and the lower temperature, soft solders, including lead and tin-containing solders. A main disadvantage in the use of hard solders is the possible built-in strain in the solder joint due to a mismatch of thermal expansion coefficients between the solder material and the fiber optic and/or substrate. The main drawback of the soft solders is their susceptibility to creep over time.

In laser welding, the fiber is sealed in a metallic support tube and welded in place using pulsed light from a high powered laser. Since the welds are made at high temperatures, the creep problem encountered in solder bonding is reduced. However, because of the way in which weld pools may solidify, some drift of the fiber out of alignment can occur during cooling.

In electroplating, a fiber is mounted within a metal tube, similar to the laser welding technique, and aligned to an optical device mounted on a metal substrate. The fiber is placed in close proximity to the substrate and a flexible conductive gel is used to connect the fiber and the substrate electrically. Thus, the fiber, the conductive gel and the substrate form a plating cathode. After electrochemical plating, a metal can be deposited across the gel to form a strong metal bridge between the fiber and the substrate. This metal bridge locks the fiber into position.

Electrostatic bonding of silicon to glass is an important packaging technique for chips and wafers in sensor technology. It allows the silicon chip to be hermetically bonded to a Pyrex glass substrate or chip, providing effective capping and shielding for silicon chips from the surrounding environment. The electrostatic bonding process can be accomplished at temperatures between 180° to 500° C., well below the softening point of the Pyrex glass used. An electrostatic attraction between the glass and silicon pieces serves to pull the two into intimate contact, thus eliminating the need for applying mechanical pressure to the wafers. Once the two materials are pulled into intimate contact, atomic bonding is formed which is as strong as the material itself.

Electrostatic bonding can be used to seal various insulating glasses to matching metals, alloys or semiconductor materials. At elevated temperatures, yet below the softening point of the glass, the positive alkali ions in the glass become quite mobile and are attracted to the negative electrode on the glass surface, where they are neutralized. The less mobile negative ions in the glass are left, forming a space charge in the glass adjacent to the silicon surface, where a large electric field forces the two materials to be bonded. This bonding technique requires that there be some amount of mobile ions, such as sodium or potassium ions, inside the glass.

Electrostatic bonding may also be applied to bond silicon to silicon. In order to bond two semiconductor materials using electrostatic bonding, an intermediate bonding material, such as sputtered borosilicate glass is required. This technique was first developed for Si—Si bonding by Brooks et al., *Journal of the Electrochemical Society*, Vol. 119, No. 4, page 545 (1972), where a first silicon surface was coated with a thin sputtered Pyrex film, followed by electrostatic bonding of two silicon substrates together.

None of the prior art discloses or suggests bonding an optical fiber to a semiconductor substrate by the use of an electrostatic bonding technique.

SUMMARY OF THE INVENTION

The present invention is directed to a process of bonding an optical fiber to a semiconductive or conductive substrate comprising contacting a metallized optical fiber with a substrate having deposited on at least a portion thereof a thin film of an alkali-containing glass, thus forming a fiber-substrate combination, applying a DC voltage potential to said fiber-substrate combination, slowly heating the fiber-substrate combination to a maximum temperature between 180° to 500° C., maintaining the fiber-substrate combination at said maximum temperature for a time period of a few minutes, cooling the fiber-substrate combination to room temperature, and removing the DC voltage potential.

Additionally, the present invention is directed to an optical interconnect produced by the above-described process.

Another object of the present invention is a process of aligning optical fibers with optical devices mounted on a semiconductive or conductive substrate, wherein at least one alignment groove is formed into the surface of said substrate, a thin film of an alkali-containing glass is deposited on the angular surfaces of said alignment groove, and a metallized optical fiber is inserted into said alignment groove and subsequently electrostatically bonded thereto. Preferably, said alignment groove is an alignment V-groove which is photolithograpically defined and etched into the surface of said substrate.

In another embodiment of the present invention, an optical fiber is coated with a thin film of an alkali-containing glass and is electrostatically bonded to a suitable substrate by contacting said fiber with said substrate, applying a DC voltage to said fiber-substrate combination, heating said combination to a maximum temperature between 180° to 500° C., maintaining said temperature for a few minutes, cooling said fiber-substrate combination to room temperature, and removing the DC voltage potential.

In a further embodiment of the present invention, a metallized film, similar to that on the metallized optical fibers, is deposited on the surface of said substrate and the alkali-containing glass-coated optical fiber is electrostatically bonded thereto.

In another embodiment of the present invention, at least one alignment V-groove is etched into the surface of said substrate for alignment of said glass-coated optical fiber(s). The alignment V-groove may have deposited thereon said thin metal film and the alkali-glass-coated fiber is electrostatically bonded to the surfaces of the V-groove.

These and other objects of the present invention will become more readily apparent from the detailed description provided below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description below and the accompanying drawings which are given below and which are given by way of illustration only, and thus are not limitative of the present invention, and wherein:

FIG. 4 is a side view of the second embodiment of the present invention, wherein a fiber optic, having deposited thereon an alkali-containing glass thin film, is electrostatically bonded to a suitable substrate.

FIG. 5 is a front view of the FIG. 4 invention.

FIG. 6 is a third embodiment of the present invention, wherein an optical fiber, having deposited thereon a thin film of an alkali-containing glass, is bonded to a thin film of metal deposited on the surface of a substrate.

FIG. 7 is a front view of the FIG. 6 invention.

DETAILED DESCRIPTION OF THE INVENTION

Figure 1:
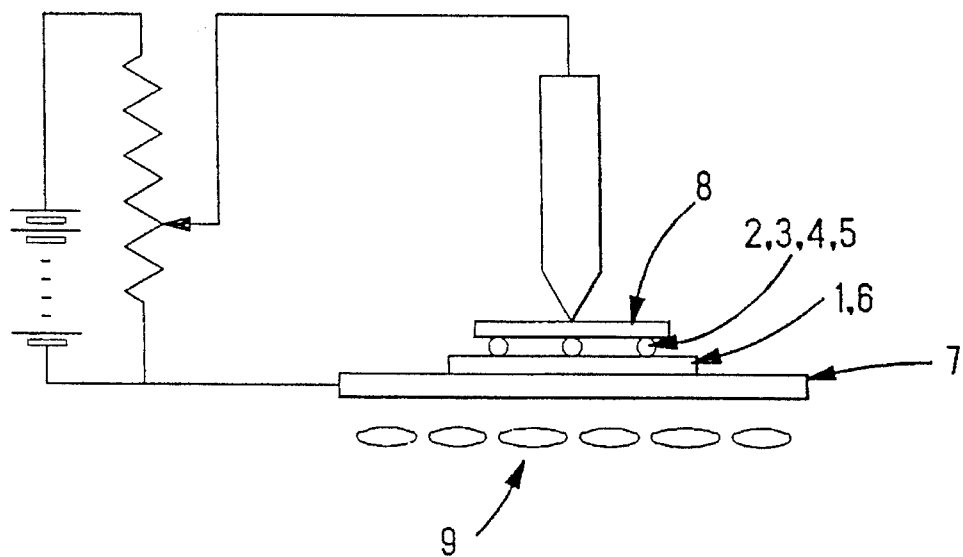
FIG. 1 is a diagram representing an apparatus suitable for practicing the electrostatic bonding technique of the present invention.

The present invention is directed to a process of bonding at least one optical fiber to a semiconductive or conductive substrate comprising contacting a metallized optical fiber with a substrate having deposited on at least a portion thereof a thin film of an alkali-containing glass, thus forming a fiber-substrate combination, applying a DC voltage to said combination, slowly heating said combination to a maximum temperature between 180° to 500° C. and maintaining the maximum temperature for at least a few minutes. Subsequently, the electrostatically bonded fiber-substrate combination is cooled to room temperature and the DC voltage potential is removed.

The process of the present invention results in a low cost, easily automated process and an easily manufacturable product which may have precise alignment of optical fibers with waferboard-mounted optical devices.

In a preferred embodiment of the presently claimed process, a thin film of an alkali-containing glass is deposited on the angular surfaces of at least one alignment V-groove which is etched in the surface of a semiconductor substrate.

In an alternative embodiment, the alkali-containing glass coating may be deposited on bare optical fibers, which may be subsequently electrostatically bonded to the surface of a suitable substrate. Optionally, the surface of said substrate may be coated with a thin film of metal.

The present inventors have discovered that a bare silica fiber cannot be directly bonded to a silicon substrate by electrostatic bonding, due to the lack of mobile ions, such as alkali ions, in said optical fiber. Accordingly, a source of said mobile ions must be provided to enhance electrostatic bonding. The present inventors have discovered that the use of a metallized silica fiber, in addition to coating the preferred substrate with an alkali-containing glass film, results in the ability to electrostatically bond said metallized silica fiber to the desired substrate.

As discussed above, the metallization of optical fibers is known in the art and commercially metallized fibers may be used in the present invention. However, a preferred technique for the metallization of the optical fibers of the present invention is sputtering. The inventors simply hang the desired portion of the fiber in the sputtering chamber and allow the non-collimated sputtering ion beam to coat the cylindrical shaped fiber completely. The uniformity of the metal coating can be improved by rotating the fibers.

In the metallization of optical fibers, a single layer metal film having suitable adhesion to the fibers, such as Au or Ni may be used. However, it is desirable that multiple layers of metal coatings be used in order to assure adhesion of the metal coating to the fiber and assure that the desired physical and chemical characteristics are present on the surface of the metallic layer. Accordingly, the inventors coat the optical fibers of the present invention with an inner layer of an adhesion-promoting first metal, such as titanium, nickel or chromium, and an outer second metal layer, such as gold, platinum, aluminum or tungsten. Optionally, intermediate metal layers may exist between the inner and outer metal layers to enhance the adhesion of the outer layer to the inner layer. Typically, the inner layer is quite thin, as compared to the outer layer; for example, an inner layer of titanium 450 Å thick may be deposited on the optical fiber under an outer layer of gold with a thickness of 1.3 microns.

It is important that the outer layer of metal be a heat-resistant or oxidation-resistant metal, including metals which can form very thin and dense oxide layers which prevent further oxidation, such as Al, due to the temperatures to which the fiber-substrate combination is subjected in the presently claimed process. Significant oxidation of the metal layer would interfere with the electrostatic bonding process.

The alkali-containing glass useful in the present invention may be selected from among those glasses known in the art, such as borosilicate glasses (Pyrex) and phosphosilicate glasses. The alkali-containing glass layer may be deposited on the conductive or semiconductive substrate by a number of conventional processes. For example, said glass may be deposited by a "spin-on" technique, or more preferably by a sputtering technique. In the sputtering process, a Pyrex glass target of less than 2 inch diameter was used with an argon plasma at a pressure of 5 mtorr and a radio frequency power of 150 watts for 6 hours. This process resulted in a coated thickness of about 2.5 microns. Preferably, in order to maintain the Si-O bonds in the sputtered glass film, the coated substrate is thermally annealed at 650° C. in wet oxygen.

In the electrostatic bonding process, a DC voltage potential of about 1 to 1500 volts is applied to the fiber-substrate combination. FIG. 1 illustrates an apparatus suitable for conducting the present process. The alkali-containing glass coated substrate, 1 and 6, is placed upon a sample stage, 7, which constitutes one electrode. The metallized fibers, 2–5, are placed in their desired position in contact with said substrate, and are contacted on the top with another electrode, 8. The fiber-substrate combination is slowly heated with a heater, 9, to a maximum temperature between 180° and 500° C. and a DC voltage of between about 1 to 1500 volts is applied.

In a preferred embodiment, the DC voltage potential is first applied and the fiber-substrate combination is subsequently slowly heated to said maximum temperature.

The voltage potential necessary to effect the present invention is dependent upon the thickness of the alkali-containing glass thin film which is deposited upon the substrate. Preferably, a low voltage of about 50 volts is applied and the maximum temperature is about 400° C. The inventors have found these parameters useful to bond metallized fibers to a substrate with an alkali-containing glass coating of about 2.5 microns thickness.

The substrate to be coated may be a conductive or a semiconductive substrate. Preferably, the substrate is a monocrystalline semiconductor material, such as Si, GaAs, or InP.

It is preferable that said semiconductor substrate have at least one alignment groove formed into the surface thereof. As previously disclosed, the process of creating alignment V-grooves is known in the art, as demonstrated by U.S. Pat. No. 4,466,696 and U.S. Pat. No. 5,163,108, the disclosures of which are incorporated herein by reference. The alkali-containing glass may be deposited either on the angular surfaces of the V-grooves, or on the bare optical fiber, in order to practice the present invention. In the latter case, the alkali-glass coated fiber may be directly bonded to a suitable substrate, such as Si, GaAs or a metal substrate, or may be bonded to an oxidation-resistant metal film deposited on the angular surfaces of said V-groove.

The period during which the maximum temperature is maintained may vary from a few minutes up to about 20 minutes, depending upon the thickness of the alkali-containing glass layer deposited on the fiber or the substrate. The maximum temperature time period is provided in the present process to allow migration of the mobile ions away from the electrostatic bonding surface.

Another object of the present invention is to provide an optical interconnect, comprising at least one metallized optical fiber electrostatically bonded to a thin film of an alkali-containing glass, said alkali-containing glass film being bonded to at least a portion of the surface of a semiconductive or conductive substrate.

Figure 2:
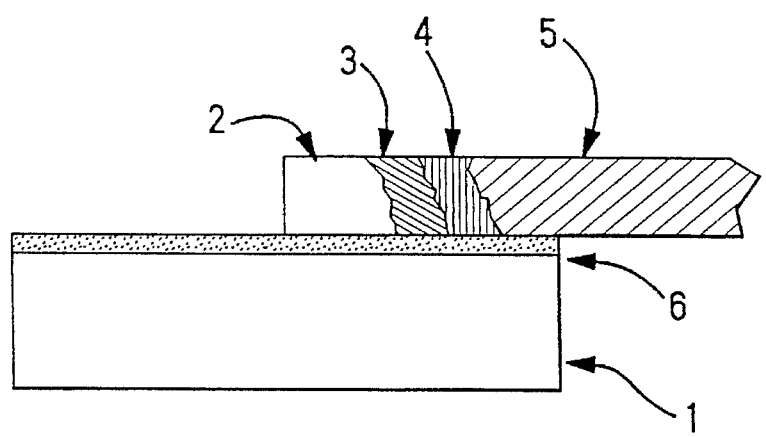
FIG. 2 is a side view of the first embodiment of the present invention, wherein a metallized optical fiber is electrostatically bonded to an alkali-containing glass layer deposited on the surface of the substrate.
Figure 3:
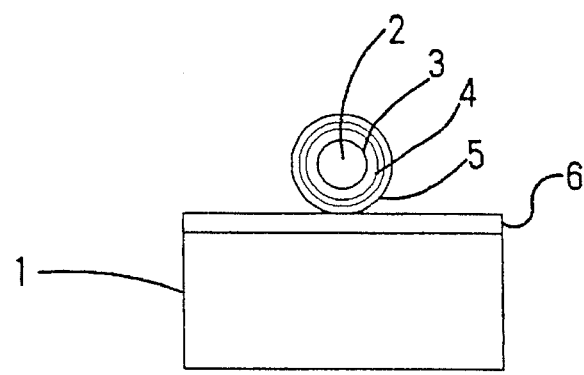
FIG. 3 is a front view of the FIG. 2 invention.

FIG. 2 (side view) and FIG. 3 (front view) illustrate a first embodiment of the presently claimed optical interconnect. A substrate, 1, is coated with an alkali-containing glass layer, 6, and electrostatically bonded to an optical fiber, 2, having disposed thereon an inner, adhesion-promoting metal layer, 3, and an outer metal layer, 5, having optionally disposed therebetween an intermediate metal layer, 4, which enhances adhesion between said inner and outer metal layers. Optionally, a single metal layer having suitable adhesion, may be deposited on said optical fiber.

A second embodiment of the presently claimed optical interconnect is illustrated by FIG. 4 (side view) and FIG. 5 (front view), wherein a suitable substrate, 1, such as silicon, is directly bonded to an optical fiber, 2, having a thin layer of an alkali-containing glass, 6, deposited thereon.

A third embodiment of the presently claimed optical interconnect is illustrated by FIG. 6 (side view) and FIG. 7 (front view), wherein the substrate has coated thereon a thin metal film, 3–5, which may be a single layer or multilayer metal film, and the alkali-glass coated optical fiber is bonded to said thin metal film.

Figure 8:
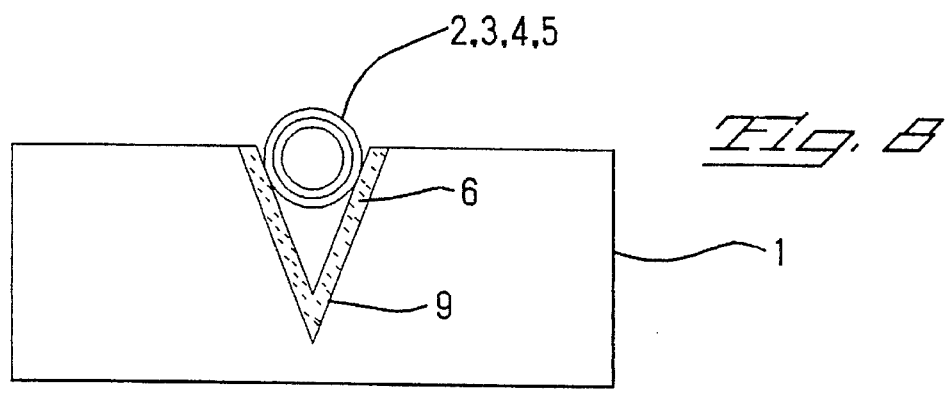
FIG. 8 is an illustration of the first embodiment of the present invention, wherein the metallized optical fiber is inserted and bonded into an alignment V-groove.

In a fourth, preferred embodiment of the present invention, FIG. 8 illustrates a substrate, 1, having etched therein at least one alignment V-groove, 9, the angular of surfaces of said V-groove being coated with an alkali-containing glass layer, 6. At least one metallized optical fiber, 2–5, is disposed therein and electrostatically bonded thereto.

In a fifth, preferred embodiment of the present invention, at least one alkali-glass coated optical fiber, 6 and 2, respectively, is disposed in at least one alignment V-groove, 9, which is etched into a suitable substrate. The alkali-glass coated fiber is electrostatically bonded directly to said substrate.

Figure 9:
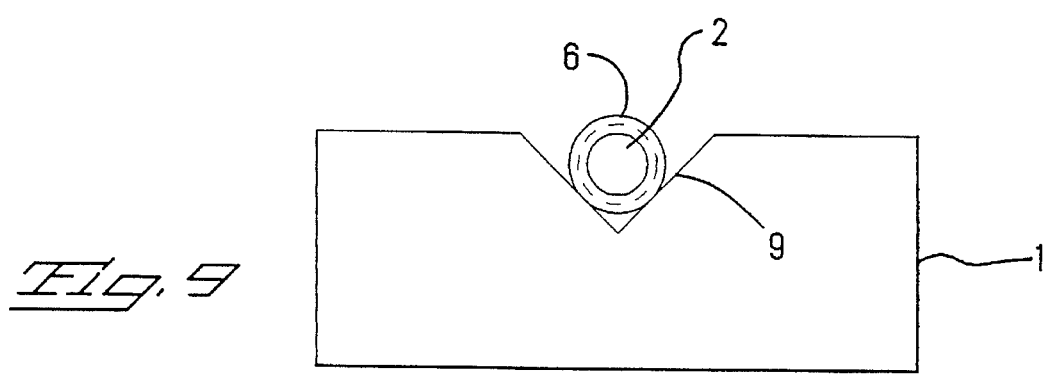
FIG. 9 is an illustration of the second embodiment of the present invention, wherein an alkali-containing glass-coated optical fiber is inserted and bonded into an alignment V-groove of a suitable substrate.
Figure 10:
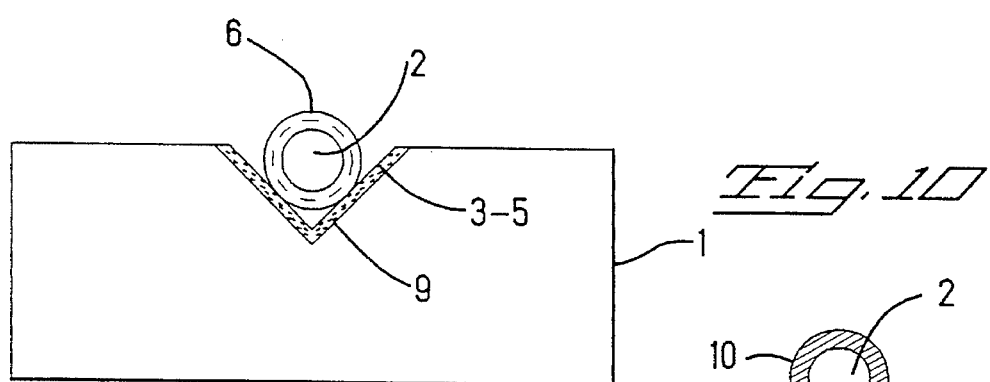
FIG. 10 is another embodiment of the present invention, wherein the alignment V-groove has deposited on the angular surfaces thereof a thin metal layer, for electrostatic bonding to the alkali-containing glass layer which is deposited on the optical fiber.

FIG. 10 illustrates a sixth embodiment, alternative to the fifth embodiment, FIG. 9, wherein said alignment V-groove, 9, has a thin film of a single layer or multilayer metal film, 3–5, disposed thereon. The alkali-glass coating on the fiber is electrostatically bonded to the metal thin film surface of the V-groove.

Figure 11:
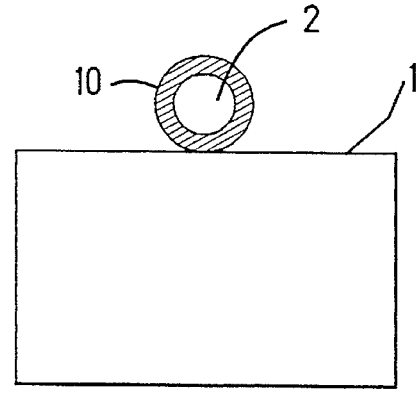
FIG. 11 illustrates an optical fiber coated with a single layer, thin metal film, said metal having suitable adhesion to said fiber, bonded to a substrate.

FIG. 11 discloses an embodiment of the present invention, wherein a thin film of a single metal, 10, having suitable adhesion to the optical fiber, 2, is coated onto said fiber and then bonded to the substrate.

Figure 12:
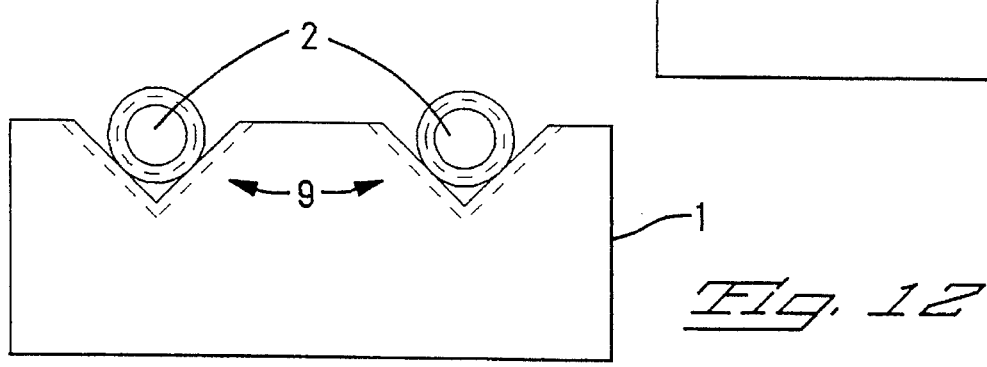
FIG. 12 illustrates a further embodiment of the present invention wherein more than one optical fiber is bonded to more than one alignment V-groove.

FIG. 12 discloses another embodiment of the present invention, wherein more than one optical fiber is bonded to more than one alignment groove, 9, formed in the substrate. Said alignment grooves and said optical fibers may be optionally coated according to the previously described embodiments of this invention.

The above objects, features and advantages of the present invention are given by way of illustration only, and are not limitative of the present invention. Various other modifications and embodiments may be made by those skilled in the art without departing from the spirit and scope of the invention.

We claim:

1. An optical interconnect, comprising at least one metallized optical fiber electrostatically bonded to a thin film of an alkali-containing glass, said alkali-containing glass being bonded to at least a portion of a planar surface of a semiconductive or conductive substrate.

2. The optical interconnect according to claim 1, wherein said optical fiber is metallized with a thin multilayer metal coating comprising an inner layer of an adhesion-promoting first metal and an outer second metal layer.

3. The optical interconnect according to claim 2, wherein said adhesion-promoting metal is titanium.

4. The optical interconnect according to claim 2, wherein said adhesion-promoting metal is nickel.

5. The optical interconnect according to claim 2, wherein said adhesion-promoting metal is chromium.

6. The optical interconnect according to claim 2, wherein said outer layer metal is gold.

7. The optical interconnect according to claim 2, wherein said outer layer metal is aluminum.

8. The optical interconnect according to claim 2, wherein said outer layer metal is tungsten.

9. The optical interconnect according to claim 2, wherein said outer layer metal is platinum.

10. The optical interconnect according to claim 1, wherein said optical fiber is metallized with a single, thin metal layer of a metal having suitable adhesion to said fiber.

11. The optical interconnect according to claim 1, wherein said alkali-containing glass is a borosilicate glass.

12. The optical interconnect according to claim 1, wherein said alkali-containing glass is a phosphosilicate glass.

13. The optical interconnect according to claim 1, wherein said substrate is a semiconductor.

14. The optical interconnect according to claim 13, wherein said substrate is monocrystalline Si.

15. The optical interconnect according to claim 13, wherein said substrate is monocrystalline GaAs.

16. The optical interconnect according to claim 13, wherein said substrate is monocrystalline InP.

17. The optical interconnect according to claim 1, wherein said thin film of alkali-containing glass is deposited on the surface of at least one alignment groove in the surface of said substrate.

18. The optical interconnect according to claim 17, wherein said alignment groove is a V-groove.

19. The optical interconnect according to claim 18, comprising more than one V-groove and more than one optical fiber.

20. An optical interconnect, comprising at least one optical fiber, having a thin film of an alkali-containing glass deposited thereon, electrostatically bonded to at least a portion of a planar surface of a semiconductive or conductive substrate.

21. The optical interconnect according to claim 20, wherein said alkali-containing glass is a borosilicate glass.

22. The optical interconnect according to claim 20, wherein said alkali-containing glass is a phosphosilicate glass.

23. The optical interconnect according to claim 20, wherein said substrate is a semiconductor.

24. The optical interconnect according to claim 23, wherein said substrate is monocrystalline Si.

25. The optical interconnect according to claim 23, wherein said substrate is monocrystalline GaAs.

26. The optical interconnect according to claim 23, wherein said substrate is monocrystalline InP.

27. The optical interconnect according to claim 20, wherein said substrate has deposited on at least a portion of the surface thereof a thin metal film.

28. The optical interconnect according to claim 20, having at least one alignment groove in the surface of said substrate.

29. The optical interconnect according to claim 28, wherein said alignment groove is a V-groove.

30. The optical interconnect according to claim 29, comprising more than one V-groove and more than one optical fiber.

* * * * *